(12) United States Patent
Prasad

(10) Patent No.: US 8,346,972 B2
(45) Date of Patent: *Jan. 1, 2013

(54) DATA SYNCHRONIZATION TRANSPARENT TO APPLICATION

(75) Inventor: Srikiran Prasad, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 35 days.

This patent is subject to a terminal disclaimer.

(21) Appl. No.: 12/764,379

(22) Filed: Apr. 21, 2010

(65) Prior Publication Data

US 2010/0205324 A1 Aug. 12, 2010

Related U.S. Application Data

(63) Continuation of application No. 11/761,834, filed on Jun. 12, 2007, now Pat. No. 7,734,828.

(51) Int. Cl.
*G06F 15/16* (2006.01)

(52) U.S. Cl. .......................................... 709/248; 707/609

(58) Field of Classification Search ................... 709/248; 707/609–612, 100–101
See application file for complete search history.

(56) References Cited

U.S. PATENT DOCUMENTS

| | | | |
|---|---|---|---|
| 7,734,690 B2 * | 6/2010 | Moromisato et al. | 709/204 |
| 2002/0054669 A1 * | 5/2002 | Rojas | 379/67.1 |
| 2002/0087544 A1 * | 7/2002 | Selkirk et al. | 707/10 |
| 2003/0126137 A1 * | 7/2003 | McFadden | 707/100 |

* cited by examiner

*Primary Examiner* — Frantz Jean

(57) ABSTRACT

Synchronization of data accessible by an application program is performed transparent to the application program. After a data item is instantiated by the application program, the synchronization engine performs data synchronization without or with minimal intervention of the application program. The synchronization engine may be part of an operating system. The synchronization engine is preinstalled on a computing device; therefore, application program developers can simply define whether the data items associated with the application programs should be syncable, and if so, to what extent the data items should be syncable. The application program developer is relieved of the task of developing the synchronization engine or other software components associated with data synchronization.

20 Claims, 9 Drawing Sheets

DATA SYNCHRONIZATION TRANSPARENT TO APPLICATION

CROSS REFERENCE TO RELATED APPLICATIONS

This application is a continuation of U.S. patent application Ser. No. 11/761,834, filed on Jun. 12, 2007, and titled "Data Synchronization Transparent to Application," which is incorporated by reference herein in its entirety.

BACKGROUND

The present invention relates generally to synchronizing data among multiple computing devices or processes, and more specifically, to a software architecture for synchronizing data among multiple computing devices or processes in a manner transparent to application programs that access the synchronized data.

Handheld devices and portable computers are becoming increasingly more powerful and functional devices. Many handheld devices are now multifunction devices with multiple device roles including: personal digital assistant (PDA), cellular phone, portable media player, voice recorder, video recorder, global positioning system (GPS), camera, and electronic file storage. Similarly, portable computers now have increased functionality and mobility. Because of these improvements in handheld devices and portable computers, data is commonly shared among multiple handheld devices and portable computers, with multiple devices accessing and modifying shared data files.

Additionally, advances in wireless Internet coverage and in wireless network capabilities made a broad range of data (such as electronic files, image files, audio files and video files) accessible to mobile communication devices, laptop computers, and other types of portable communication systems. Network improvements have also allowed electronic data to be accessed and modified from virtually any location. This combination of improved wireless network access and improved portable device functionality has caused users increasingly to access and modify electronic data from multiple, often widely separated, locations using multiple different portable devices.

Because multiple devices can access and modify the same data, the different data modifications should be synchronized to ensure the each device accesses the most recent version of the data. For example, a user may use one portable device to edit an electronic document in one location, and later use a different portable device to access the same electronic document from a different location. Synchronization ensures that the electronic document accessed by the second portable device includes the modifications made using the first portable device. Synchronization is also used where a multiple users can access and modify the same data from multiple devices in various locations, requiring the data to be synchronized among the multiple computing devices.

In developing any application program that uses data synchronized among multiple devices, application program developers are given the task of developing synchronization schemes for synchronizing the data associated with an application program. Designing and programming algorithms for synchronizing the data involves developing data structures and schemes to resolve conflicts associated with the synchronized data. Depending on the complexity of the handheld device or portable computers, developing the algorithms for data synchronizing can become a task taking up significant amount of time and resource of the application program developers.

Further, the synchronization algorithm of the application program may also be prone to errors once deployed on the handheld devices or portable computers due to incompatibility with other applications using the same or different synchronization schemes. As the number of application programs and the number of corollary components for performing synchronization increase, the handheld devices or portable computers are more likely to encounter conflicts or errors during the synchronization operations. Absent careful designing by the application programmers, the errors during the synchronization operations can result in corruption of the data or deadlocks among different application programs.

Also, different data synchronization schemes used by different application may lead to wasted resources of the handheld device or portable computers. Each application program uses different or separate software components, data structure, and communication sessions for the data synchronization. Therefore, the amount of resources for data synchronization must be increased as the number of installed application programs is increased. Using multiple software components, data structure and communication sessions results in inefficient use of the resources.

Therefore, there is a need for a method that facilitates the application developers, including third parties, to develop the application programs that need data synchronization. There is also a need for a synchronization method that is transparent to the application programs that use the synchronized data. There is also a need to provide a data synchronization scheme that reduces errors associated with the synchronization operations. There is also a need for a data synchronization scheme that efficiently uses the resources of the computing devices.

SUMMARY

Embodiments of the invention separate functionality of data synchronization from other functionality of application programs. The functionality associated with the data synchronization is implemented by a synchronization engine that is separate from the application program. An application program does not need to contain any codes or minimal amount of codes for performing synchronization operations. By separating the functionality associated with synchronization, it becomes possible to perform synchronization operation in a manner transparent to the application program. Also, developing of the application program is simplified.

Embodiments of the invention allow an application program to instantiate a data item with reference to synchronization data structure in a synchronization engine. The synchronization data structure in the synchronization engine defines a data structure that is compatible with the synchronization engine for synchronization the instantiated data item via the synchronization engine. By referencing the synchronization data structure during instantiation of the data item, the data item instantiated by the application program becomes syncable via the synchronization engine.

In one embodiment, different application programs use the same synchronization engine to perform data synchronization of the data items associated with the application programs. Each application program instantiates the data item associated with the application by referencing the synchronization data structure in the synchronization engine. Therefore, the data item conforms to the data structure as defined by the synchronization data structure of the synchronization engine regardless of the application program the data item is associated with.

In one embodiment, the synchronization data structure of the synchronization engine represents a data structure associated with synchronizing the data with the other computing device. The data structure includes a class with a first attribute for defining whether a category of the data item is syncable with the other computing device, a second attribute for defining whether the data item can be individually configured to be syncable; and a third attribute for defining whether certain fields of the data item can be individually configured to be syncable.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Embodiments of the invention can be readily understood by considering the following detailed description in conjunction with the accompanying drawings.

DETAILED DESCRIPTION OF EMBODIMENTS

Figure 1:
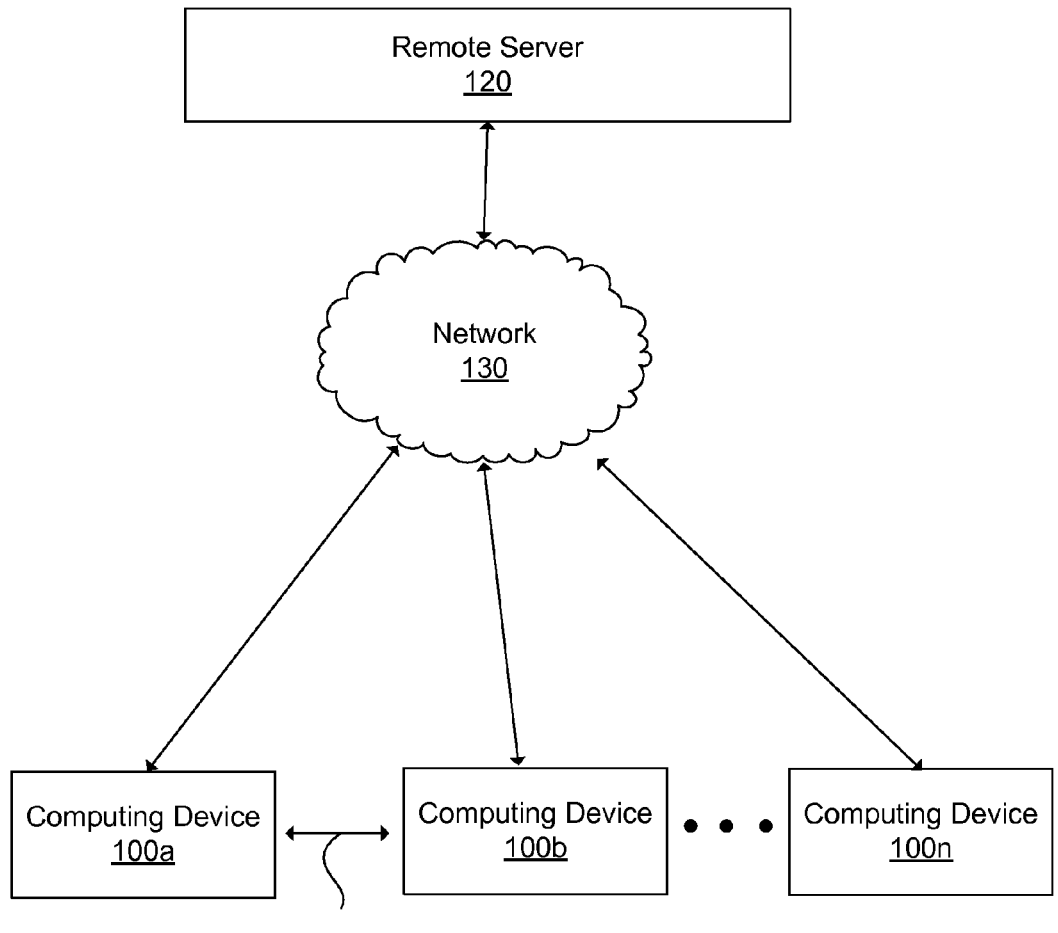
FIG. 1 is a schematic diagram illustrating a conventional architecture for synchronizing data among multiple computing devices.

The embodiments of the invention will be described below with reference to the accompanying drawings. Like reference numerals are used for like elements in the accompanying drawings.

In the embodiments, synchronization of data associated with an application program is performed transparent to the application program. After a data item is instantiated by the application program, a synchronization engine performs synchronization without or with minimal intervention of the application program. The application program references the synchronization data structure of the synchronization engine when instantiating the data items. Thus, the data items instantiated by the application program becomes syncable through the synchronization engine without additional code or functionality within the application program to implement synchronization operations. The synchronization engine is pre-installed on a computing device as part of the operating system or a separate application programming interface (API); therefore, application program developers may simply define whether the data items associated with the application programs should be syncable, and if so, to what extent the data items should be syncable.

A synchronization engine a software component that is implemented as an application programming interface (API) on a layer above the operating system or is part of an operating system. The synchronization engine is separate from the application program. The synchronization engine performs operations for synchronizing data among multiple computing devices. The operations performed by the synchronization engine may include, among other operations, identifying whether a data item stored on a computing device has a counterpart data item stored on another computing device, setting and enforcing priority between the data items stored on multiple computing devices, transmitting the data item from one computing device to another, and maintaining a time stamp indicative of the time the data item was synchronized.

The synchronization data structure is information stored on the synchronization engine defining a data structure for data items syncable via the synchronization engine. A function call to the synchronization engine may be made to reference the synchronization data structure to instantiate syncable data items. The application program references the synchronization data structure to instantiate the data item associated with the application program. The synchronization data structure, for example, may be information representing a class in an object-oriented program.

A data item refers to a piece of data that the application program identifies as a single unit. For example, the data item may be a calendar entry for a personal scheduler program, contact information for a contact management program, a single or a thread of email for an email client program, or an image file for an image viewer program. One data item may be associated with or accessible by one or more application programs.

Syncable data items are data items that can be synchronized with data items stored, e.g., on another computing device or used by another application via the synchronization engine. A category of data items may be configured to be syncable. Alternatively, only an individual data item or certain fields of the data items may be configured as syncable.

FIG. 1 is a schematic diagram illustrating a conventional architecture for synchronizing multiple computing devices 100a-100n. The synchronization architecture may be a peer-to-peer based architecture, a remote server based architecture, or a combination of both. In the peer-to-peer base architecture, two computing devices 100a, 100b communicate with each other using a channel 142 established between the two devices 100a, 100b. The communication channel 142 between the two computing devices 100a, 100b may be established using a wired interface (e.g., Universal Serial Bus (USB)) or it may be a wireless interface (e.g., Bluetooth). In the remote server based architecture, the computing devices 100a-100n synchronize their data items with a remote server 120 through a network 130 shared by the computing devices.

The remote server 120 functions as a central data repository that backs up syncable data items from the computing devices 100a-100n. The backed up syncable data items may be retrieved by the computing device 100a-100n during the synchronization operations. The network 130 may be in any form including: the internet, cable TV network, PSTN (Public Switched Telephone Network), radio network, cellular network, satellite TV network, WI-FI network, workplace enterprise network, and any combination thereof.

Figure 2:
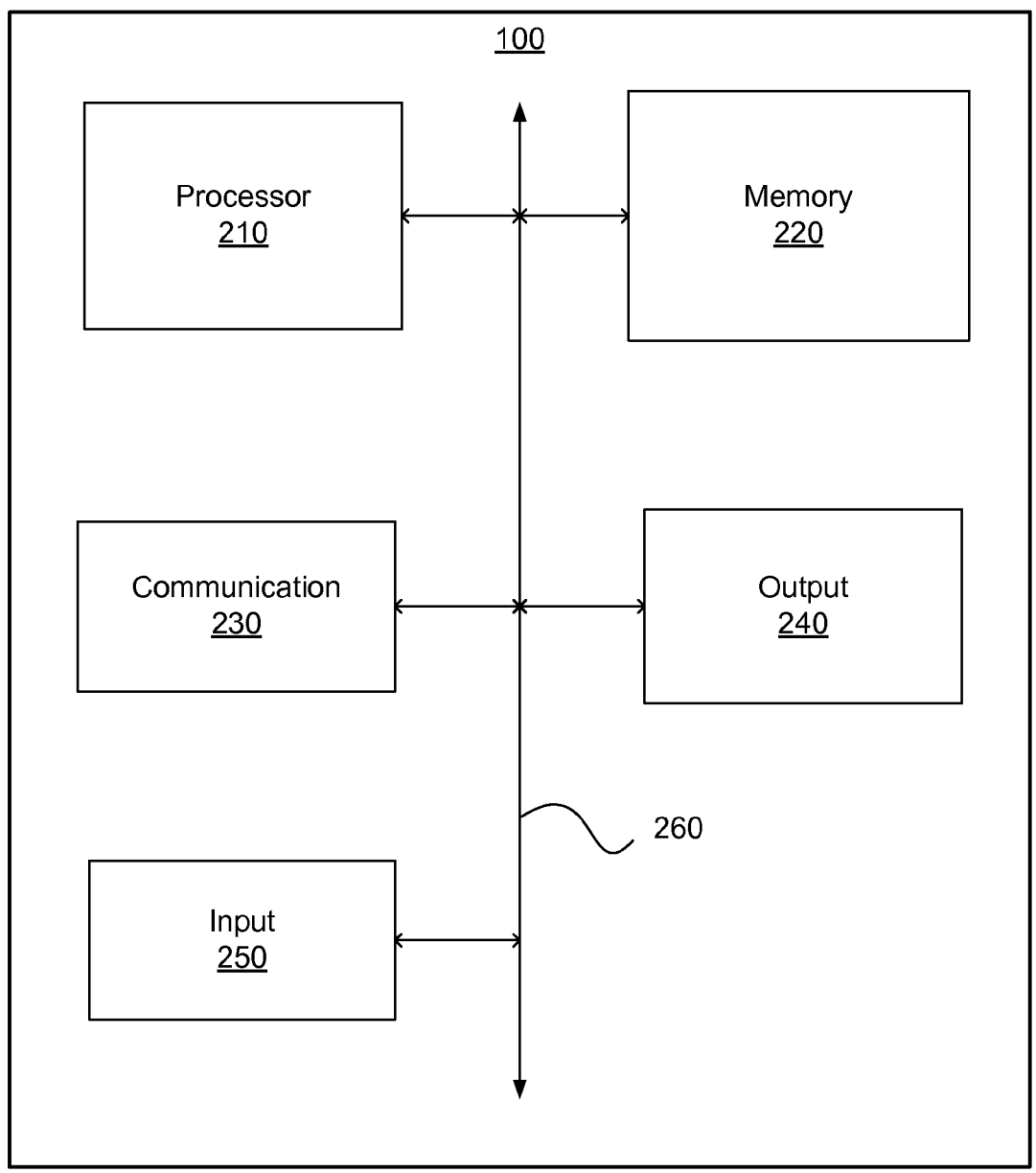
FIG. 2 is a block diagram illustrating a computing device, according to one embodiment.

FIG. 2 is a block diagram illustrating a computing device 100, according to one embodiment. The computing device 100 includes, among other components, a processor 210, a memory module 220, a communication module 230, an output module 240, an input module 250, and a bus 260. These components are briefly explained herein to the extent they are directly related to the invention. Each component of the computing device 100, whether alone or in combination with other components, may be implemented for example, in software, hardware, firmware or any other combination thereof.

The processor 210 executes instructions and manipulates data necessary for the data synchronization. The processor 210 may be a microprocessor such as an ARM processor by ARM, Inc., a Pentium® processor by Intel Corp. or an Athlon XP® by Advanced Micro Devices, an ASIC, a FPD (Field Programmable Device), a microcontroller, or any other device capable of executing instructions and manipulating data.

The memory module 220 stores program codes executed by the processor to perform, among other operations, data synchronization, and tasks of the operational system, and tasks of the application programs. The memory module 220 also stores data items associated with the application programs. The memory module 220 may be a non-volatile type persistent memory such as a hard disk, a compact flash, or an EEPROM. The memory module 220 may be also be a volatile type such as a random access memory, a buffer, a cache, a register, a combination of non-volatile and volatile memory, or other device capable of storing instructions and data. The program codes and data items stored on the memory module 220 are explained in detail below with reference to FIG. 3.

The communication module 230 performs a peer-to-peer communication with other computing devices or communicates with the remote server 120 via the network 130.

The output module 240 includes an output controller (not shown) that is coupled to output devices such as a display device or a speaker. The input 250 includes an input controller (not shown) that is coupled to an input device such as a keypad or touch screen to receive inputs from a user. The input module 240 and the output module 250 may be implemented as hardware, software, or a combination thereof. The input module 240 and the output module 250 may also be capable of servicing other input/output modules or peripheral devices associated with the computing device 100.

The processor 210, the memory module 220, the communication module 230, the output module 240, and the input module 250 communicate with each other through a conventional bus 260.

Figure 3:
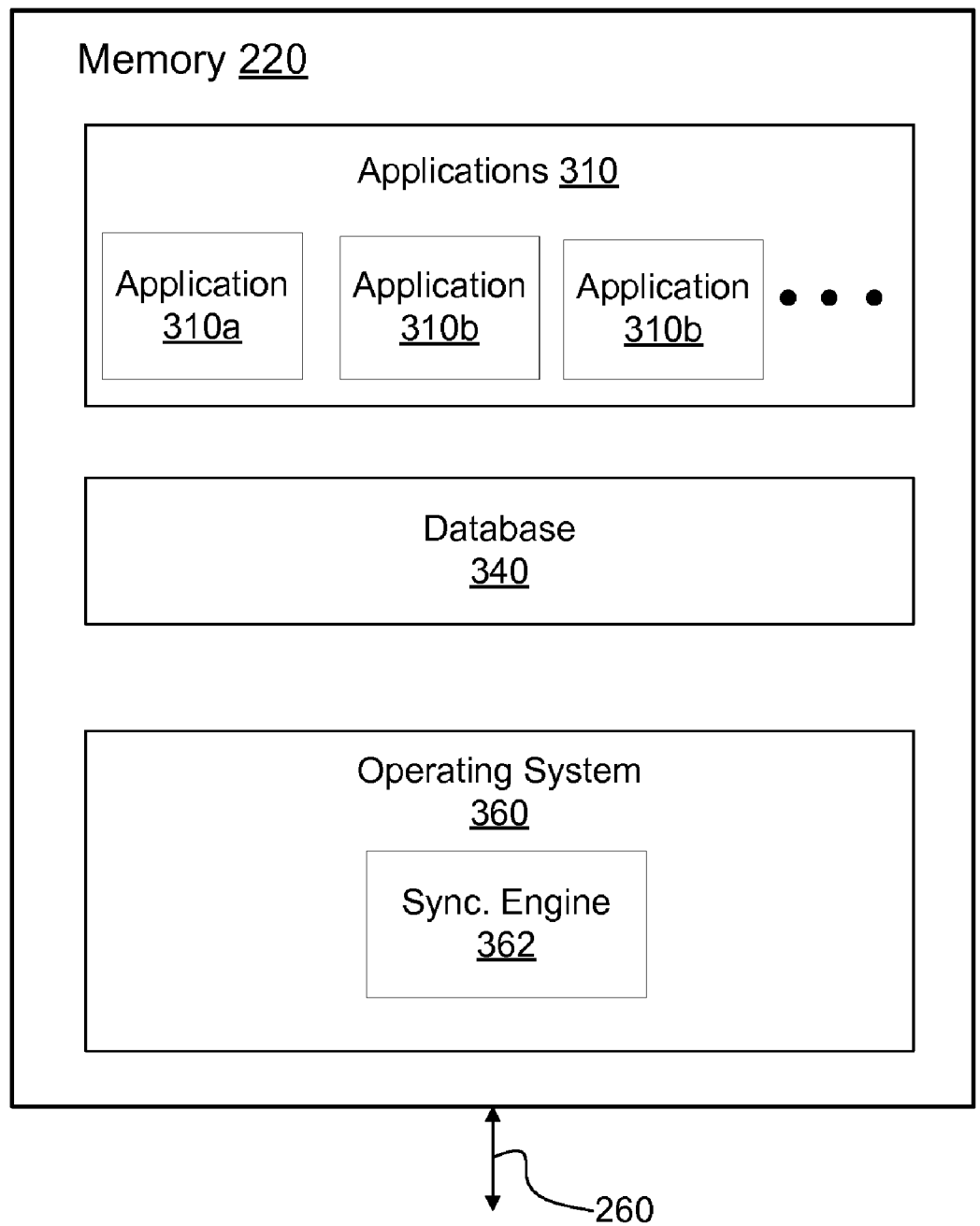
FIG. 3 is a block diagram illustrating data stored in a memory module of the computing device, according to one embodiment.

FIG. 3 is a block diagram illustrating data stored in a memory module 220 of the computing device 100, according to one embodiment. The data of the memory module 220 includes application programs 310, a database 340, and an operating system 360.

The application programs 310 include programs, including but not limited to, video and music players (e.g., Pocket Tunes, Kinoma, Windows Media Player, RealPlayer, iTunes, PowerDVD, QuickTime, and Winamp), web browsers (e.g., NetFront, Microsoft Internet Explorer, Mozilla Firefox, and Apple Safari), image viewers (e.g., VD Image Viewer, and ADCSee), document viewers (e.g., Adobe Acrobat), and word processor applications (e.g., Documents To Go, Microsoft Word, and WordPerfect). Some of the application programs may require their data to be syncable with other computing devices, while other application programs may not require any of their data to be syncable or even require that the data not be syncable. One embodiment facilitates configuration of synchronization attributes by allowing the application programs 310 to instantiate data items by referencing the data structure stored in a synchronization engine 362.

The database 340 is a data repository that stores the data items associated with the application programs in name-value pairs. In the embodiment of FIG. 3, the syncable or non-syncable data items are stored in the database 340. In this embodiment, all of the application programs 310 share the same database 340, and the application programs 310 do not generate or maintain a separate database or data repository for their data items. Using the same database 340 for all of the application programs 310 is advantageous because each program does not need program codes to implement separate database for its use, and the synchronization engine 362 may synchronize all the data items without addressing idiosyncrasies of different databases. Also, using the same database 340 has additional benefit that it is less likely to cause discrepancy in the data due to synchronization operations. The functions provided by the database include, among other functions, adding data items, deleting data items, updating data items, querying data items, registering data items for notification, and tracking changes in data items as explained below in detail with reference to FIG. 5.

The operating system 360 may comprise Palm OS by Palm, Inc., Windows CE or Windows XP by Microsoft, or any other operating system that facilitates interoperability between hardware and software. The operating system include, among other components, the synchronization engine 362 for performing procedures associated with synchronizing data with other computing devices.

The synchronization engine 362, in conjunction with the database 340, performs the synchronization operations. The synchronization engine 362 instructs the database 340 to add, delete, or update entries in accordance with the synchronization operations. In one embodiment, the application programs 310 do not need to intervene in the synchronization operations other than instructing the synchronization engine 362 to initiate or schedule a synchronization session. Therefore, the synchronization operations are transparent to the application programs 360. In this way, the application developers need only to implement the application programs 310 to call functions of the synchronization engine 360 without programming the application programs 310 to instantiate syncable data items and carry out the data synchronization operations, as explained below in detail with reference to FIG. 9.

Figure 4:
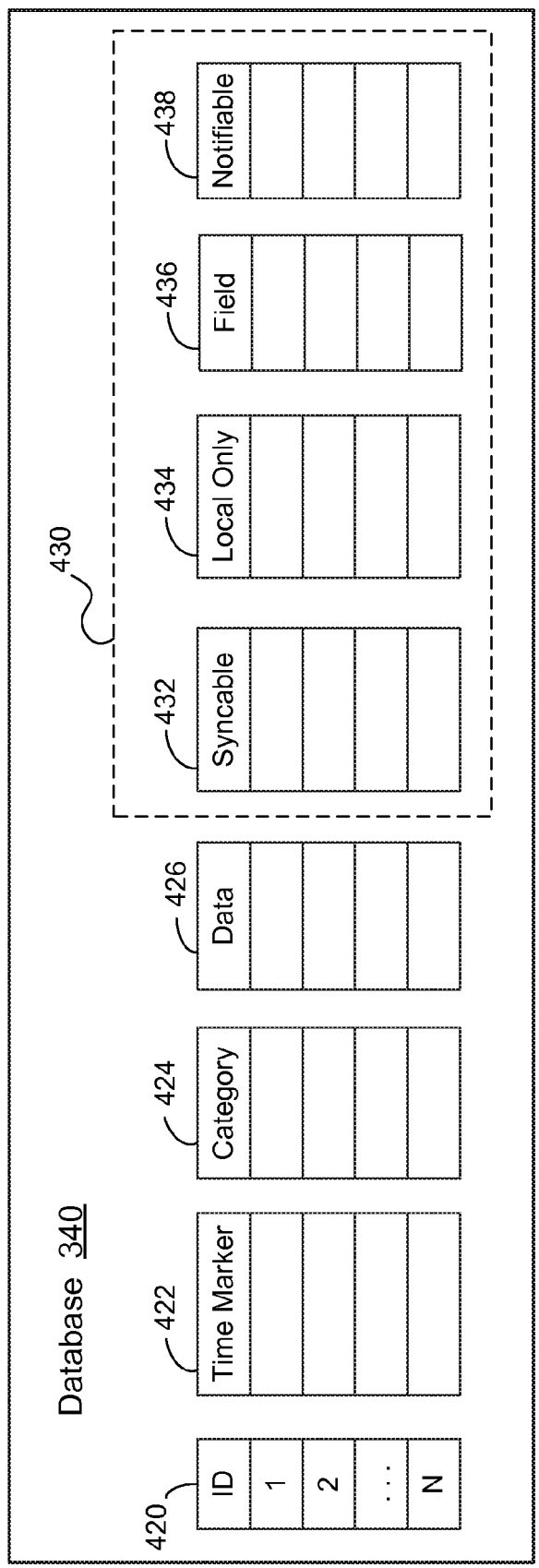
FIG. 4 is a diagram illustrating a database implemented on the memory module, according to one embodiment.

FIG. 4 is a diagram illustrating the database 340 of the memory module 220, according to one embodiment of the present invention. In the embodiment of FIG. 4, the database 340 includes, among other data, parallel tables 420 to 428. Each row of the tables 420 to 438 represents a synchronization attribute for an entry of a data item.

In the embodiment of FIG. 4, the database 340 includes, among other tables, an ID table 420, a time marker table 422, a category table 424, and a binary data table 426, and synchronization attribute tables 430. The ID table 420 includes entries with unique numbers identifying the entry within the database 340. The time marker table 422 includes entries for information indicating the history of any changes to the data item. The category table 424 indicates the category of data items. The category of the data item may include, for example, "calendar item," "contact information," "picture," and "email." Each application program 310 may use a separate category of data items, or the same category of data items may be used across different application programs 310. The binary data table 426 includes the binary information associated with the data item.

The synchronization attribute tables 430 include tables with entries associated with the synchronization attributes. As explained below in detail with reference to FIG. 5, the synchronization attributes are defined in a Sync Base Class which is a superclass of other classes associated with individual application programs 310. The synchronization attribute tables 430 include, among other tables, a syncable table 432, a local only table 434, a field table 436, and a notifiable table 438.

The entries of the syncable table 432 indicate whether the category to which the data item belongs is syncable. If a category of the data items is defined as being syncable, all of the data items belonging to that category are by default syncable. Each data item in the syncable category may then be individually configured as non-syncable by changing the entries of the local only table 434 corresponding to that data item.

The entries of the local only table 434 indicate whether particular data items are syncable. If the category to which the data items belong is indicated as being syncable in the syncable table 432, the entries of the local only table 434 may indicate that the data item of the syncable category has opted out of the default syncable status and is non-syncable.

The entries of the field table 436 indicate whether certain fields of the data item are syncable. For example, if the contact item includes separate fields for a home address, a business address, a cell phone number, and a business phone number, it may be preferable to configure only the business address and the business phone number as syncable but not the home address and the cell phone number. If so, the entries of the field table 436 may be configured so that only the business address and the business phone number are syncable but not the home address and the cell phone number.

The entries of the notifiable table 438 indicate whether the data items are "notifiable." If a data item is notifiable, the database 340 informs the synchronization engine 362 of changes made to the entry of that data items. The changes to the data items may be prompted by access to the data items by the application programs 310, or other operations performed by the operating system 360. After being notified of the changes to the entry of the data item, the synchronization engine 362 may initiate a synchronization session immediately or perform synchronization of that notifiable data item during the next scheduled synchronization session.

The various tables illustrated in FIG. 4 are merely illustrative. Various other tables or data structures may be employed to achieve the same function. For example, some or all of the synchronization attribute tables 430 may be combined into a single table, or a table (e.g., the field table 438) may be subdivided into multiple tables.

Figure 5:
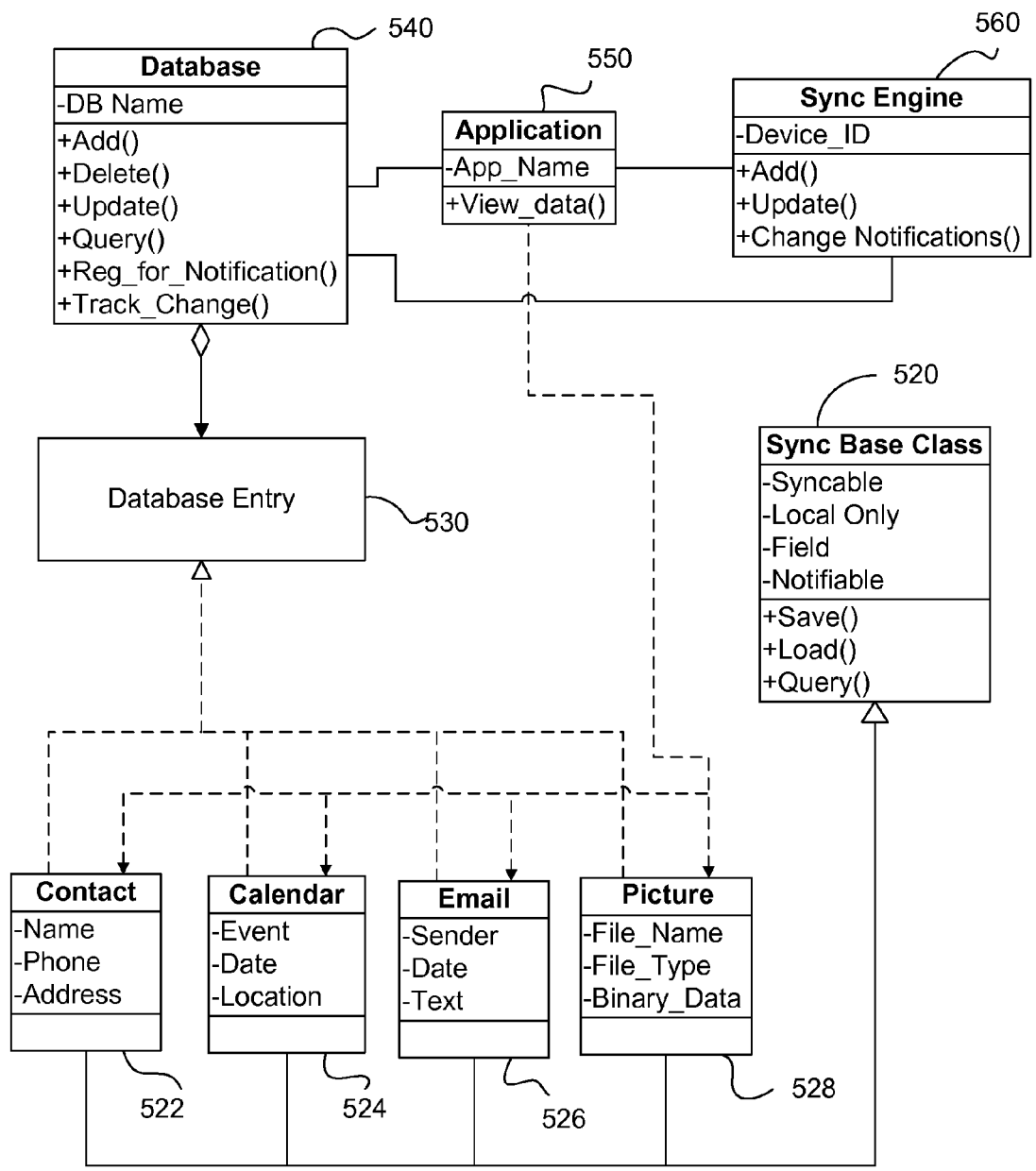
FIG. 5 is a Unified Modeling Language (UML) diagram illustrating classes associated with synchronization, according to one embodiment.

FIG. 5 is a Unified Modeling Language (UML) diagram illustrating classes associated with the synchronization operations and the syncable data items, according to one embodiment. In the embodiment of FIG. 5, the software components for data synchronization are programmed using an object-oriented program, such as C++ or Java. The classes associated with the data synchronization in the embodiment of FIG. 5 include: Database Class 540, Application Class 550, Synchronization Engine Class 560, Sync Base Class 520, and subclasses of the Sync Base Class 520 (i.e., classes 522 to 528).

Database Class 540 is associated with the database 340 of FIG. 3, and has an attribute DB Name representing the name of a database instance. The database class 540 includes, among other functions, the following functions: Add( ) Delete( ) Update( ), Query( ) Reg_for_Notification( ) and Track_Change( ) Add( ) is a function adding an entry to an instance of Database Class 540. Delete( ) is a function deleting an entry from an instance of Database Class 540. Update( ) is a function updating an entry for an instance of Database Class 540. Query( ) is a function for performing query operations to the entries of Database Class 540. Reg_for_Notification( ) is a function for registering a data item as a "notifiable" data item. Track_Change( ) is a function for tracking any changes made to a data item. The queries may be performed based on various attributes of the data items stored in the database 540. The Database Class 540 includes multiple Database Entry Classes 530.

Application Class 550 is associated with the application programs 310 of FIG. 3, and has attribute App_Name indicating the name of the application program. Application Class 550 has, among other functions, View_data( ) function associated with accessing the instances of the subclasses 522-528.

Synchronization Engine Class 560 is associated with the synchronization engine 362 of FIG. 3, and has the attribute of Device_ID that identifies the computing device on which the synchronization engine 362 is instantiated. Synchronization Engine Class 560 has functions of Add( ) Update( ), and Change Notifications( ) Add( ) function adds an entry to an instance of Database Class 540 during the synchronization operations. Update( ) function updates a data item stored in an instance of Database Class 540 during the synchronization operations. Change Notifications( ) function changes the notification status of a data item from a "notifiable" to "non-notifiable" or vice versa. In one embodiment, the instance of Synchronization Engine Class 560 is an Application Programming Interface (API) which is part of the operating system as illustrated in FIG. 3.

Sync Base Class 520 is a superclass including functions and attributes associated with the synchronization operations. Sync Base Class 520 includes, among other attributes, "Syncable" attribute, "Local only" attribute, "Field" attribute, and "Notifiable" attribute. The subclasses 522-528 inherit functions and attributes from Sync Base Class 520, and thus, the instances of the subclasses 522-528 have attributes associated with Sync Base Class 520 that are realized as entries in the syncable table 430, the local only table 434, the field table 436, and the notifiable table 438 as explained above with reference to FIG. 4.

The subclasses of Sync Base Class 520 include, among other classes, Contact Class 522, Calendar Class 524, Email Class 526, and Picture Class 528. These classes inherit from Sync Base Class 520; thus, the instances of these classes have attribute values associated with the synchronization operations. Contact Class 522 is associated with contact information, and includes attributes such as Name, Phone, and Address. Calendar Class 524 is associated with calendar entries, and include attributes such as Event (indicating the name of the event), Date (the date the event is taking place), and Location (the location where the event is taking place). Email Class 526 is associated with emails, and includes attributes such as Sender (sender of the email), Date (date the email was receive) and Text (body of the email). Picture Class 528 is associated with image items, and includes attributes such as File_Name, File_Type, and Binary_Data. The instances of Contact Class 522, Calendar Class 524, Email Class 526, and Picture Class 528 are realized as the instances of Database Entry Class 530.

Figure 6:
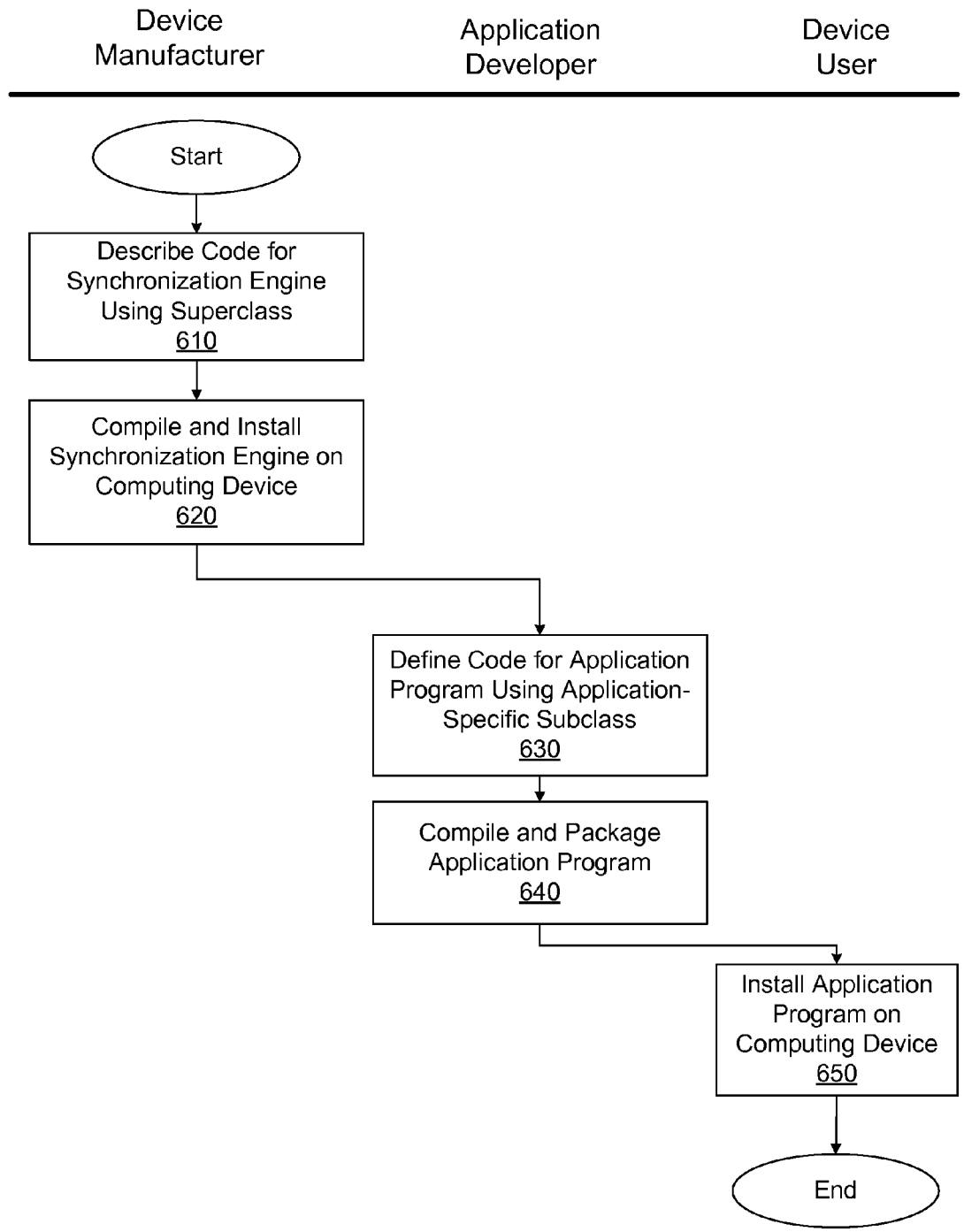
FIG. 6 is a flowchart illustrating a method of programming a synchronization engine and an application program that instantiate data compatible with the synchronization engine, according to one embodiment.

FIG. 6 is a flowchart illustrating a method of programming the synchronization engine and the application programs, according to one embodiment of the present invention. First, a device manufacturer or operating system developer describes 610 a code for implementing the synchronization engine 362. The code describes and defines Sync Base Class 520 which is the superclass of other subclasses to be implemented by the application developers. The device manufacture or operating system developer then compiles and installs 620 the synchronization engine 362 on the computing device 100. Because the code implementing the synchronization engine 362 includes codes representing Sync Base Class 520, the synchronization engine 362 includes functions and the information on the data structure (i.e., class) required for performing the data synchronization.

The application developer is provided with information regarding the functions and attributes associated with Sync Base Class 520. Based on this information, the application developer describes and defines a code for the application program using application-specific subclasses (e.g., Contact Class 522, Calendar Class 524, Email Class 526, and Picture Class 528 of FIG. 5). The code for the application is then compiled and packaged 640 by the application developer. Beneficially, the application developer may describe a minimal amount of code or no code associated with the synchronization operations because the synchronization engine 362 is provided and installed on the computing device 100 as part of the operating system 360 or a separate API. The application developer is given the minimal task of programming the application program 310 to call functions from the synchronization engine to instantiate syncable data items, and to instruct initiation of the synchronization operations of the synchronization engine 362.

A user of the computing device 100 then installs 650 the application program 310 on the computing device 100 as explained below with reference to FIG. 8.

The example of FIG. 6 is merely illustrative of a typical method of programming the synchronization engine and the application programs. Various other arrangements may be used. For example, the operating system may be installed by the user, not the device manufacturer.

Figure 7:
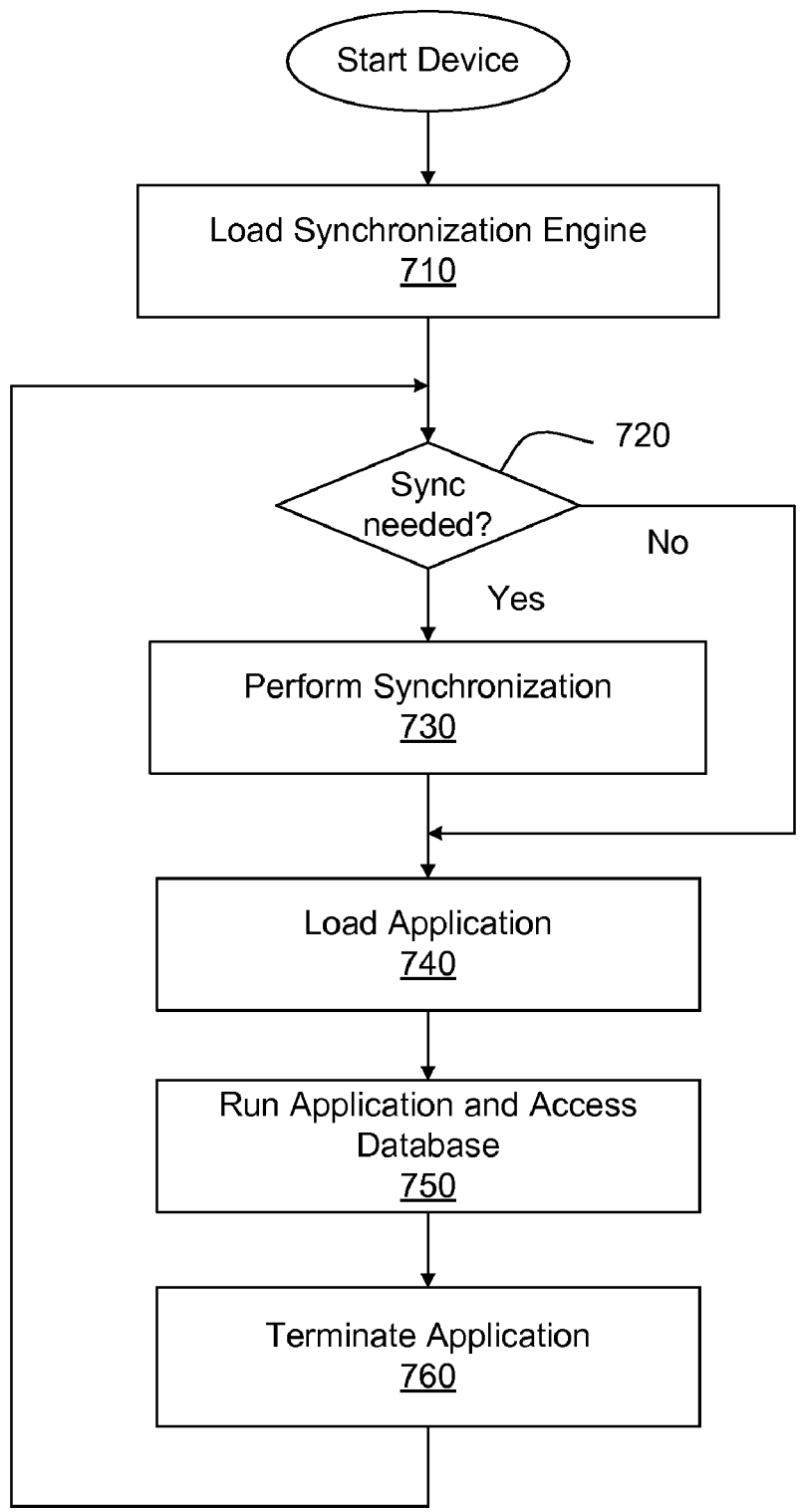
FIG. 7 is a flowchart illustrating a method of operating a computing device using a data synchronization process, according to one embodiment.

FIG. 7 is a flowchart illustrating a method of operating the computing device using the synchronization operations, according to one embodiment. First, the synchronization engine 362 is loaded 710 to the computing device 100. If it is determined 720 that data synchronization needs to be performed, then the synchronization operations are performed 730 by the synchronization engine 362. Then the application program 310 is loaded 740. Then the computing device 100 runs 750 the application program 310, and accesses the database 340. The application program 310 is then terminated 760 and the process returns to step 720.

Figure 8:
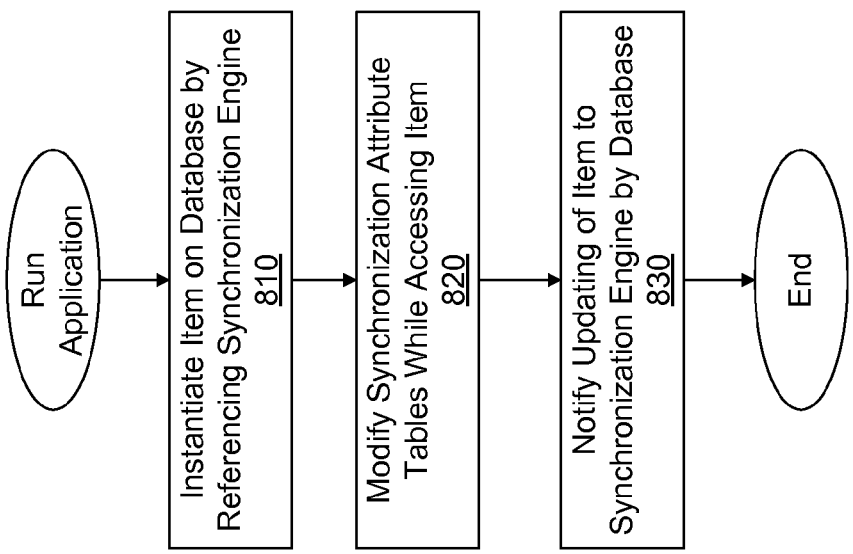
FIG. 8 is a flowchart illustrating a method of running the application, according to one embodiment.

FIG. 8 is a flowchart illustrating the method of running the application, according to one embodiment of the present invention. First, the application program 310 instantiates 810 new data items on the database 340 by referencing the data structure (i.e., Base Sync Class 520) from the synchronization engine 362. When a data item is already instantiated on the database 340, the entries in the synchronization attribute tables 430 of the database 340 may be modified 820, as explained below with reference to FIG. 10, to prevent the synchronization engine 362 from synchronizing the data item being accessed by the application program 310. Also, when a "notifiable" data item is added, updated, or deleted by the application program 310, the database 340 notifies the change to the synchronization engine 362. In response, the synchronization engine 362 may perform 730 synchronization operations immediately or at the next synchronization session to synchronize the data item with other devices.

Figure 9:
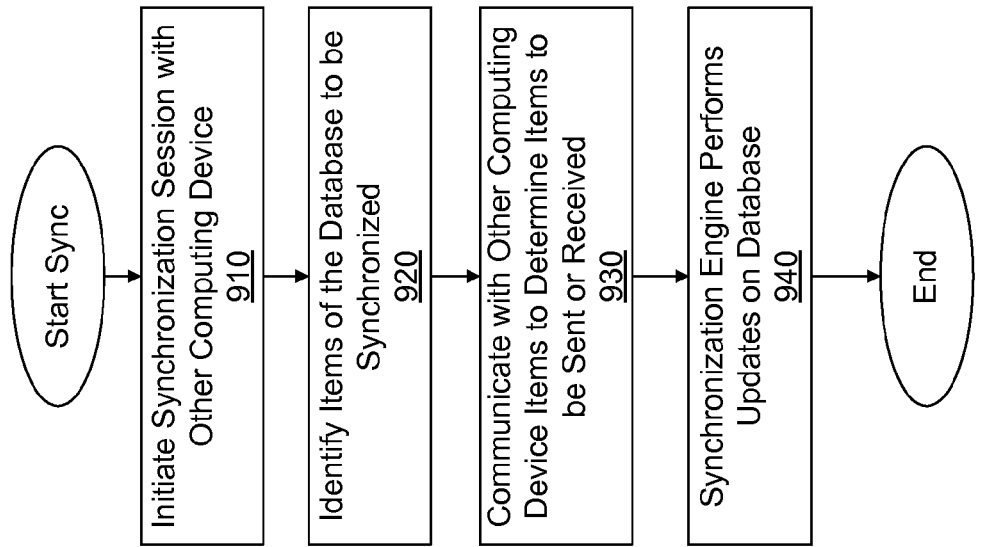
FIG. 9 is a flowchart illustrating a method of synchronizing data using the synchronization engine, according to one embodiment.

FIG. 9 is a flowchart illustrating a method of synchronizing data using the synchronization engine 362, according to one embodiment. First the synchronization engine 362 initiates 910 a synchronization session with another computing device. After the synchronization session is initiated, the synchronization engine 362 identifies the data item to be synchronized during this synchronization session. To identify the data items for synchronization, the synchronization engine 362 may retrieve the information on the "notifiable" data items previously notified from the database 340 or send queries to the database 340. The query to the database 340 may be made based on various criteria, including the category of the data (e.g., query for data items of certain categories), and the entry in the time marker (e.g., query for data items updated since the last synchronization). Based on the identification of the data items to be synchronized, the synchronization engine 362 communicates 930 with a synchronization engine of the other computing device (not shown) to determine the data items to be received or sent. Then the synchronization engine 362 updates 940 the syncable data items stored on the database 340.

Figure 10:
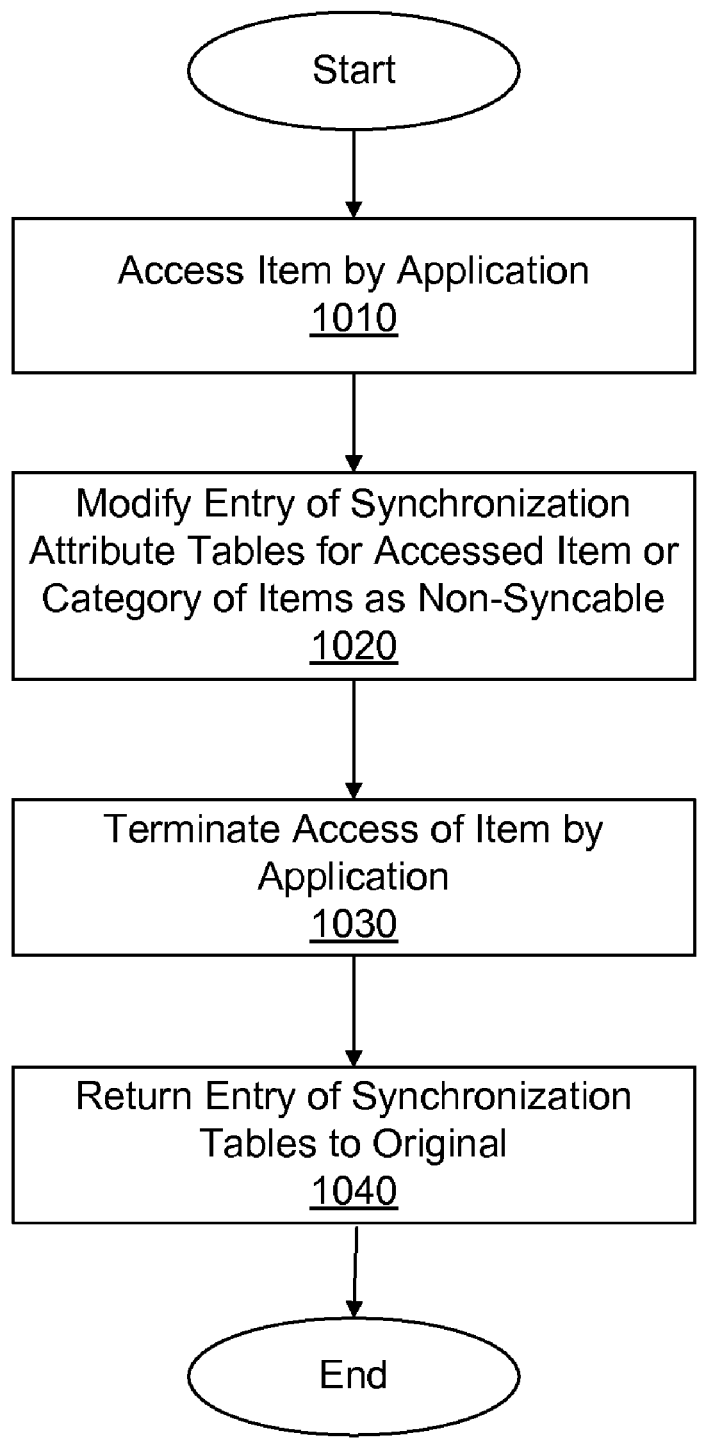
FIG. 10 is a flowchart illustrating a method of preventing synchronization of a data item while the data item is being accessed by the application program, according to one embodiment.

FIG. 10 is a flowchart illustrating a method of preventing synchronization of a data item while the data item is being accessed by the application program 360, according to one embodiment of the present invention. When the application program 360 accesses a data item, it is necessary to prevent the synchronization engine 362 from accessing the data item. If the synchronization engine 362 attempts to access the data item being accessed by the application, the data item can become corrupt or result in the deadlock of processes of the application programs 360 and the processes of the synchronization engine 362. By modifying the entry in the database 340, the data item can be prevented from synchronization.

The granularity of data items to be locked from synchronization operation during the access of a data item by the application programs 310 may be configured by modifying the entries of the synchronization attribute tables 430. Specifically, by modifying the entries in any of the syncable table 432, the local only table 434, and the field table 436 as non-syncable, a category of data items having the same category as the data item being accessed by the application program 310, the particular data item being accessed by the application program 310, or a certain field of the data item being accessed by the application program 310 may be locked from the synchronization operations.

First, a data item is accessed 1010 by the application. The database 340 then modifies entries in the syncable table 432, the local only table 434, or the field table 436 in accordance with a lock table (not shown) of the database 340 or instructions from other components of the computing device 100 (e.g., the application program 310 or the operation system 360). The lock table or the instructions from the other components define the data items or fields to be locked while a data item is being accessed by the application program 310. By modifying an entry of the data item in the syncable table 432 as non-syncable, all of the data items having the same category as the data item being accessed by the application program 310 are recognized by the synchronization engine 362 as being non-syncable; thus, the category of data items are prevented from being synchronized by the synchronization engine 362. By modifying an entry of the data item in the local only table as non-syncable, the data item currently being accessed by the application program 310 is recognized by the synchronization engine 362 as being non-syncable; thus, that data item is prevented from being synchronized by the synchronization engine 352. Lastly, by modifying an entry in the field table of the data item 436 as non-syncable, certain fields of the data item are recognized by the synchronization engine 362 as being non-syncable; thus, these fields of the data item are prevented from being synchronized by the synchronization engine 352.

After the application program 360 terminates 1030 access to the data item, the modified entry of the syncable table 432, the local only table 434, or the field table 436 is returned 1040 to the original value (i.e., syncable).

By preventing access to the data items or fields of the data item through modification to the tables associated with the synchronization operations, errors caused by the synchronization process may be eliminated or be reduced without adopting other elaborate or complex schemes.

As recognized through the example of the computing device herein, the various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a software configured multimedia control mechanism through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of synchronizing data between computing devices, the method being implemented by one or more processors that perform steps comprising:
   referencing a synchronization data structure, the synchronization data structure defining a data structure of a data item that can be selectively synchronized across a plurality of computing devices;
   instantiating the data item according to the synchronization data structure; and
   synchronizing the instantiated data item with at least one of the plurality of computing devices.

2. The method of claim 1, wherein the synchronization data structure comprises a superclass, the superclass defining attributes and functions associated with synchronizing data, and wherein instantiating the data item comprises using a subclass of the superclass.

3. The method of claim 1, wherein the synchronization data structure comprises:
   a first attribute for indicating whether the data item belongs to a category that is syncable with the at least one of the plurality of computing devices.

4. The method of claim 3, wherein the synchronization data structure further comprises:
   a second attribute for indicating whether the data item can be individually configured to be syncable with the at least one of the plurality of computing devices; and
   a third attribute for indicating whether one or more fields of the data item can be individually configured to be syncable with the at least one of the plurality of computing devices.

5. The method of claim 4, further comprising modifying a field of the data item representing at least one of the first attribute, the second attribute, or the third attribute responsive to the data item being accessed to prevent the data item from being synchronized as the data item is being accessed.

6. The method of claim 3, wherein the synchronization data structure comprises a notification attribute that defines when changes to the data item can be synchronized with the at least one of the plurality of computing devices.

7. The method of claim 1, wherein the data item is selected from a group consisting of: contact information, calendar information, an email and an image.

8. A non-transitory computer readable storage medium structured to store instructions executable by a processor in a computing device, the instructions, when executed cause the processor to:
   reference a synchronization data structure, the synchronization data structure defining a data structure of a data item that can be selectively synchronized;
   instantiate the data item according to the synchronization data structure; and
   perform synchronization of the instantiated data item with at least one of the plurality of computing devices.

9. The computer readable storage medium of claim 8, wherein the synchronization data structure comprises data representing a superclass, the superclass defining attributes and functions associated with synchronizing data, and wherein instructions to instantiate the data item comprises instructions to use a subclass of the superclass.

10. The computer readable storage medium of claim 9, wherein the synchronization data structure comprises:
    a first attribute for indicating whether the data item belongs to a category that is syncable with the at least one of the plurality of computing devices.

11. The computer readable storage medium of claim 10, wherein the synchronization data structure further comprises:
    a second attribute for indicating whether the data item can be individually configured to be syncable with the at least one of the plurality of computing devices; and
    a third attribute for indicating whether one or more fields of the data item can be individually configured to be syncable with the at least one of the plurality of computing devices.

12. The computer readable storage medium of claim 11, the instructions when executed, further cause the processor to modify a field of the data item representing at least one of the first attribute, the second attribute, or the third attribute responsive to the data item being accessed to prevent the data item from being synchronized as the data item is being accessed.

13. The computer readable storage medium of claim 11, wherein the synchronization data structure comprises a notification attribute that defines when changes to the data item can be synchronized with the at least one of the plurality of computing devices.

14. The computer readable storage medium of claim 11, wherein the data item is selected from a group consisting of: contact information, calendar information, an email or an image.

15. A computing device for synchronizing data with another computing device, comprising:
    a data repository for storing data;
    a communication module configured to communicate with the other computing device;
    a first module for synchronizing data in the data repository with the other computing device via the communication module, the first module comprising code representing a synchronization data structure that defines a data structure of a data item that can be selectively synchronized; and
    a second module comprising code for referencing the synchronization data structure in the first module to instantiate a first data item accessed by the second module.

16. The computing device of claim 15, wherein the synchronization data structure comprises:
    a first attribute for indicating whether the first data item belongs to a category that is syncable with the other computing device.

17. The computing device of claim 16, wherein the synchronization data structure further comprises:
    a second attribute for indicating whether the first data item can be individually configured to be syncable with the other computing device; and
    a third attribute for indicating whether a field of the first data item can be individually configured to be syncable with the other computing device.

18. The computing device of claim 17, wherein a field of the first data item corresponding to at least one of the first attribute, the second attribute, or the third attribute is modified responsive to the first data item being accessed by the second module to prevent the first data item from being synchronized as the first data item is being accessed by the second module.

19. The computing device of claim 17, wherein the synchronization data structure comprises a notification attribute that defines when changes to data items in the data repository can be synchronized with the other computing device.

20. The computing device of claim 15, wherein the first data item is selected from one of: a contact, a calendar entry, an email, a text document, and an image.

* * * * *